United States Patent [19]
Rim

[11] 3,945,416
[45] Mar. 23, 1976

[54] STEERING WHEEL COVER

[76] Inventor: Ho Yon Rim, Rua Iperdig 270, Perdizes, Sao Paulo, Brazil

[22] Filed: June 20, 1974

[21] Appl. No.: 481,145

[52] U.S. Cl. ............... 150/52 M; 150/54 B; 74/558
[51] Int. Cl.² ............................................. B62D 1/06
[58] Field of Search ......... 74/558, 558.5; 150/52 M, 150/52 K, 52 L, 54 B

[56] References Cited
UNITED STATES PATENTS

| | | | |
|---|---|---|---|
| 1,446,628 | 2/1923 | Ridge | 74/558 |
| 1,978,105 | 10/1934 | Flanagan | 74/558 |
| 2,078,059 | 4/1937 | Churchill | 74/558 |
| 2,157,950 | 5/1939 | Best | 74/558 |

FOREIGN PATENTS OR APPLICATIONS

| 1,089,449 | 9/1954 | France | 74/558 |
|---|---|---|---|

Primary Examiner—Donald F. Norton
Attorney, Agent, or Firm—Parmelee Miller, Welsh & Kratz

[57] ABSTRACT

A cover for a steering wheel having a wire or other rigid circular member of fixed diameter greater than the inside diameter, but less than the outside diameter, of the steering wheel, and an annulus of elasticized fabric or other flexible elastic material secured to the wire. The annulus has an outside diameter corresponding to the diameter of the wire and a radial width corresponding to the axial circumference of the steering wheel. The wire is placed along the inside or lower surface of the steering wheel rim in abutting relationship, and the elastic material is stretched around the axial circumference of the steering wheel such that the elasticity of the material causes the material to grip the steering wheel and form a cover therefor.

5 Claims, 9 Drawing Figures

U.S. Patent  March 23, 1976  Sheet 1 of 2  3,945,416

STEERING WHEEL COVER

BACKGROUND OF THE INVENTION

1. Field of the Invention

This invention relates generally to covers for steering wheels for automobiles, trucks, boats, or other vehicles, and also to hand wheels of any type having a shape similar to steering wheels upon which a cover may be desired. More specifically, the invention relates to such covers which are easily and quickly attached to the steering wheel and removed therefrom for cleaning or other purposes.

2. Description of the Prior Art

Since the early days of automobiles, it has been recognized that hard-surfaced steering wheels are often improved by the use of a cover which provides for a better and more secure grip on the steering wheel and which also is more comfortable to grip over a period of time. For example, such covers prevent excessive dampening of the wheel by sweat during the hot weather and provides comfort for a driver in instances where the wheel itself may be very hot or very cold. There have, therefore, been numerous attempts to design covers for steering wheels which have these advantages and which also may be easily attached to the wheel and removed therefrom for cleaning or other purposes.

In U.S. Pat. NO. 1,446,628, a hollow rubber ring having a slit and thickened beads along the edges of the slit is forced over the rim of the steering wheel. The cover is composed of rubber constructed so that it is normally smaller in circumference than the circumference of the wheel to which it is to be applied. U.S. Pat No. 1,978,105 shows a rectangular piece of non-elastic fabric which is assembled on the wheel by laces passing through eyelets in the strip of fabric. U.S. Pat. No. 2,078,059 teaches a cover of knitted or woven fabric formed as a straight, flat strip and joined to form a cylindrical shape. This is stretched over the rim of the wheel and secured to the wheel by an adhesive. U.S. Pat. No. 2,157,950 describes a steering wheel cover formed from a strip of fabric material which has flexible rings that are of a diameter less than the interior diameter of the rim of the steering wheel. This cover includes the use of a strip of latex to prevent slippage of the cover.

In those instances where covers are formed having a dimension such that the cover normally has a diameter less than that of the wheel to which it is to be attached, such covers are stretched and pulled over the wheel with a resulting tendency for the inner flanges of the cover to be raised from the inner surface of the rim of the wheel, giving an uncomfortable feeling to the driver. Thus, the flanges of such covers do not abut the inner surface of the rim, but rather are, by tension on the stretched cover, raised and leave a gap between the flanges of the cover and the wheel rim.

It is an object of the present invention to provide a steering wheel cover which, when assembled on a steering wheel rim, will provide for abutment of the flanges of the cover to the inner surface of the wheel.

SUMMARY OF THE INVENTION

A steering wheel cover is provided including a rigid circular member having a fixed diameter greater than the inside diameter but less than the outside diameter of the steering wheel, and an annulus of flexible elastic material having an outside diameter corresponding to the diameter of the rigid circular member. The annulus of flexible elastic material has a radial width substantially corresponding to the axial circumference of the steering wheel and is secured to the rigid circular member along the circumference of the annulus. When the rigid circular member is placed on the inside or lower surface of the steering wheel, the flexible elastic material may be stretched around the axial circumference of the steering wheel such that the elasticity of the material causes the material to grip the steering wheel and form a toroid corresponding to the shape of the steering wheel. The rigid member is thus held in abutting relationship to the surface of the wheel and is not raised therefrom. The rigid circular member may be a wire or may be a rigid element integral with the annulus of flexible elastic material. The annulus of flexible elastic material is preferably planar when not stretched around the steering wheel, and, while not required, may include additional fastening means such as snaps, adhesive strips, or lacing on the inside and outside circumferences to hold more securely the flexible elastic material around the steering wheel.

DESCRIPTION OF THE PREFERRED EMBODIMENT

Figure 1:
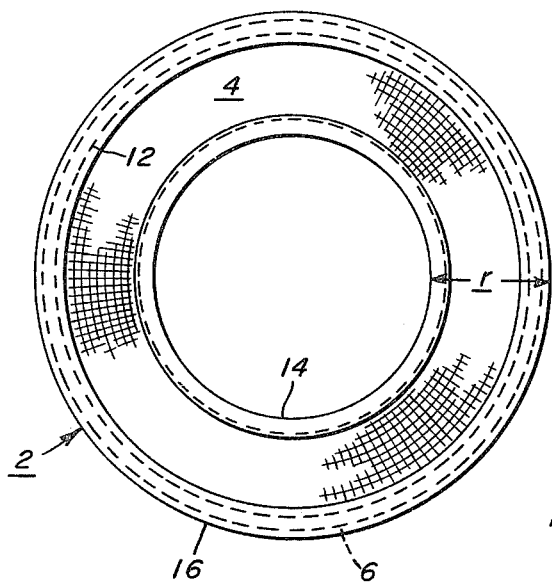
FIG. 1 is a plan view of the steering wheel cover of the present invention.
Figure 2:
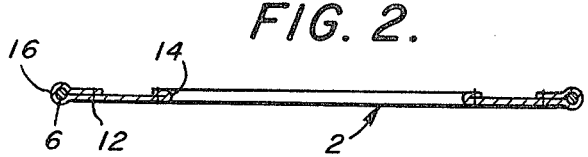
FIG. 2 is a sectional view of one embodiment of the steering wheel cover of the present invention.
Figure 3:
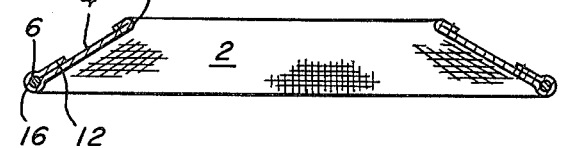
FIG. 3 is a view similar to FIG. 2 of another embodiment of the steering wheel cover of the present invention.
Figure 4:
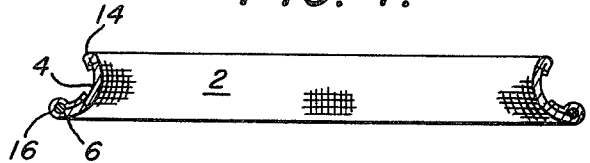
FIG. 4 is a view similar to FIG. 2 of another embodiment of the steering wheel cover of the present invention.
Figure 5:
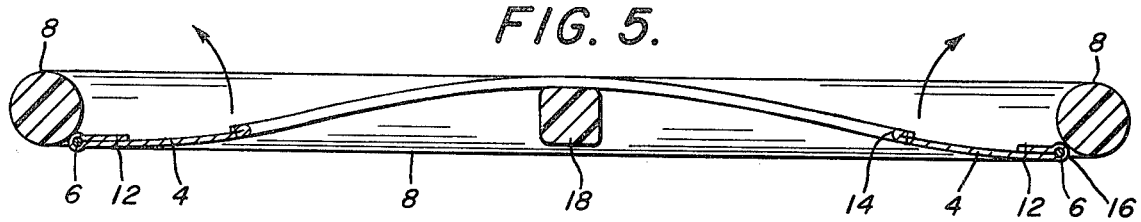
FIG. 5 is a view similar to the view of FIG. 6 showing the cover illustrated in FIG. 2 positioned to be stretched over the rim of a steering wheel.
Figure 8:
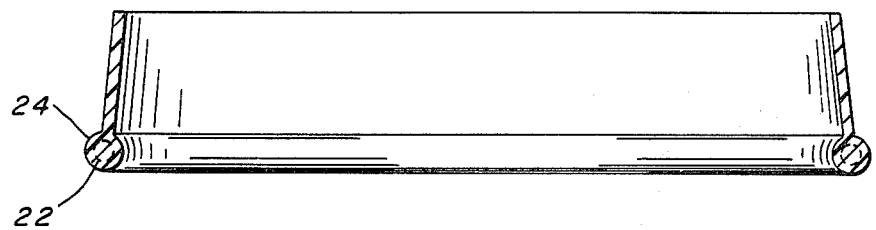
FIG. 8 is a view similar to FIG. 2 of another embodiment of the steering wheel cover of the present invention.

In FIG. 1, a steering wheel cover designated generally 2 is formed from an annulus 4 of flexible elastic material. A preferred material is an elastic fabric. Joined to the annulus 4 of elastic fabric is a wire or other rigid, circular member 6. This wire 6 has a diameter greater than the inside diameter, but less than the outside diameter, of the rim portion 8 of the steering wheel 10 to which the cover 2 is to be applied, as illustrated in FIG. 5. The annulus 4 is secured to the wire 6 such as by folding the fabric over the wire and securing it with stitching 12 as shown in FIG. 1. Although the cover 2 is described herein in the embodiment wherein the rigid circular member is a wire, and the flexible elastic material is an elastic fabric, the invention is not necessarily limited to this embodiment. For example, the annulus 4 of flexible elastic material may be formed from a molded rubber or other elastic material. In such an embodiment the wire 6 may be embedded in the rubberous material or may be replaced by an integral circular member of rigid rubberous or plastic material. For example, as shown in FIG. 8, a rigid circular member 22 made of PVC or similar nonelastic plastic material is integrally formed, such as by vulcanization, inside an elastic rubberous material 24, which also forms the annulus 4. Similarly, although the preferred embodiment described includes an annulus 4, which is planar, as shown in FIG. 2, the annulus may also be non-planar or disc-shaped, as shown in FIG. 3, or other similar shapes, which will enable folding over of the annulus on the rim of the steering wheel. For example, the elastic material may be formed in such a manner that the inside circumference 14 is somewhat curved back toward the wire 6 even when not attached to the steering wheel 10, as shown in FIG. 4.

Figure 7:
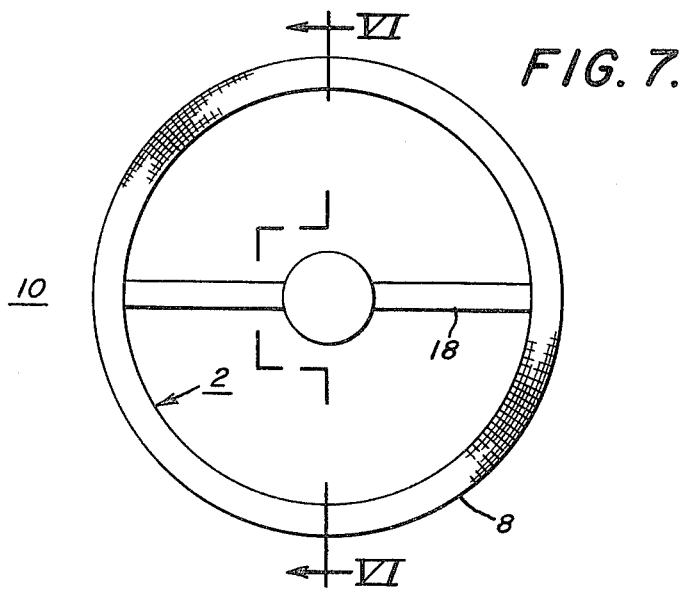
FIG. 7 is a plan view of the steering wheel having a cover of the present invention applied thereto.

When secured to the rigid circular member 6, the annulus 4 has an outside diameter corresponding to the diameter of the rigid circular member 6 and has a radial width r, from the inside circumference 14 to the outside circumference 16, which substantially corresponds to the axial circumference of the steering wheel rim 8. The axial circumference of the steering wheel rim 8 is intended to mean the circumference of the crosssection of the rim 8, as shown in FIG. 5, as distinguished from the longitudinal circumference of the steering wheel 10 overall, as shown in FIG. 7.

Figure 6:
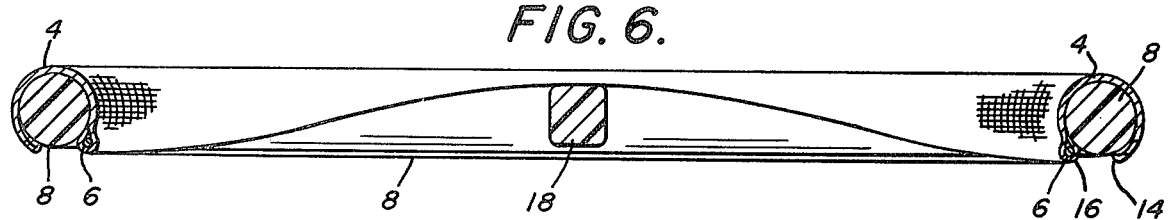
FIG. 6 is a sectional view taken along the line VI—VI of FIG. 7 with the cover of FIG. 2 secured to a steering wheel rim.
Figure 9:
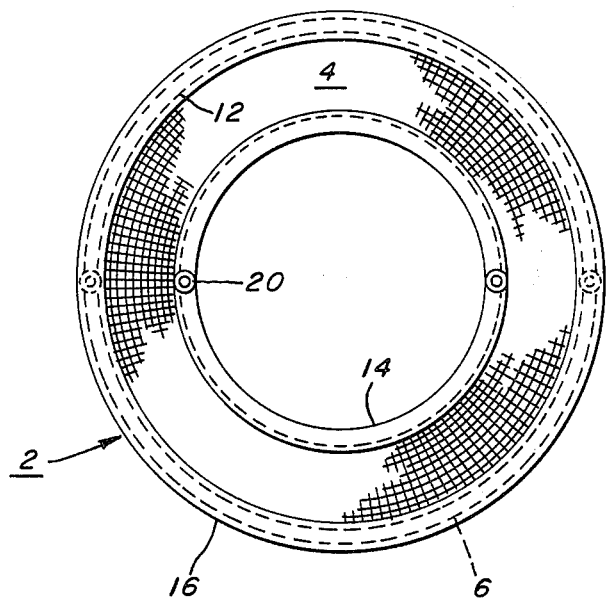
FIG. 9 is a view similar to FIG. 1 showing the use of fasteners on the steering wheel cover of the present invention.

In use, the steering wheel cover 2, constructed as herein described, is placed along the inside or lower surface of the steering wheel 10, as shown in FIG. 5. In this position the wire 6, or other rigid circular member, abuts the surface of the steering wheel rim 8. After the steering wheel cover 2 is placed in the position shown in FIG. 5, the annulus 4 of flexible elastic material is stretched out and around the steering wheel rim 8, as shown by the arrow, and by its own elasticity surrounds the steering wheel rim 8 to form a toroidal shape corresponding to the shape of the steering wheel rim 8, as shown in FIG. 6. The elasticity of the material causes the cover 2 to grip the steering wheel 10. Thus, no adhesives or fasteners are necessary to secure the cover to the steering wheel 10. Although no further securement means are necessary, if it is desired to more securely fasten the cover 2 to the steering wheel 10, additional fastening means, such as snaps, laces, or adhesive strips may be attached to the inside circumference 14 and the outside circumference 16 of the steering wheel cover 2. For example, as shown in FIG. 9, snaps 20 may be attached to the annulus 4 to more securely fasten the cover 2 to the steering wheel 10. Because of the elasticity of the material of annulus 4, however, only a small number of such snaps or the like would be used, and they may be so positioned as to not be obstructed by the spokes 18 of the steering wheel 10.

When positioned on the steering wheel, one flange or outer circumference 16 of the cover will be retained by the wire 6 in abutting relationship with the inner surface of the steering wheel 8 (FIG. 6). The other flange, or inner circumference 14, of the cover may be in spaced position from outer circumference 16 when assembled on the wheel and will, by its own elasticity, abut the surface of the wheel 8. Where the annulus 4 of the cover is slightly larger than the axial circumference of the wheel rim 8, however, the inner circumference 14 of the cover may be folded over the wheel rim and either tucked under the rigid circular member to assure a close fit of both inner circumference 14 and outer circumference 16 in abutting relationship to the inner surface of the wheel rim 8, or folded over the rigid circular member.

There has been herein described a steering wheel cover which is simply constructed, and which easily attaches to and is removed from the steering wheel for cleaning or other purposes. Such a steering wheel cover does not require laces, snaps or other fastening means as required in certain prior art covers, nor does it require adhesive to secure it to the steering wheel as required in certain other prior art covers, although such additional fasteners may be provided. Also, the cover disclosed, by its own elasticity, surrounds the rim of the steering wheel and does not pull away from the steering wheel at its ends, as do certain prior art covers, with at least one flange of the placed cover being in abutting relationship with the inner surface of the steering wheel rim.

I claim:

1. A cover for a steering wheel rim comprising:
    a circular wire having a fixed diameter greater than the inside diameter of the steering wheel rim and less than the outside diameter of the steering wheel rim; and
    an annulus of flexible elastic material having an outside diameter corresponding to the diameter of the circular wire and a radial width substantially corresponding to the axial circumference of the steering wheel rim, the flexible elastic material being secured to the circular wire along the circumference of the annulus;
    whereby when the circular wire is placed in abutment with the surface of the steering wheel rim, and the flexible elastic material is stretched around the axial circumference of the steering wheel rim, the elasticity of the material causes the material to grip the steering wheel and form a toroid corresponding to the shape of the steering wheel rim.

2. A cover for a steering wheel as defined in claim 1 wherein the circular member is integral with the annulus of flexible elastic material.

3. A cover for a steering wheel as defined in claim 1 wherein the annulus of flexible elastic material is planar when not stretched around the steering wheel.

4. A cover for a steering wheel as defined in claim 1 including fastening means on the inside and outside circumferences of the annulus of flexible elastic material to secure together said circumferences.

5. A cover for a steering wheel as defined in claim 1 wherein the flexible elastic material is an elastic fabric.

* * * * *